US010824401B2

United States Patent
Ganesh et al.

(10) Patent No.: US 10,824,401 B2
(45) Date of Patent: Nov. 3, 2020

(54) METHOD AND SYSTEM FOR AUTOMATED CREATION OF GRAPHICAL USER INTERFACES

(71) Applicant: Mphasis Limited, Bangalore (IN)

(72) Inventors: Jai Ganesh, Bangalore (IN); Rajendrakumar Mishra, Thane (IN); Archisman Majumdar, Bangalore (IN)

(73) Assignee: Mphasis Limited (IN)

( * ) Notice: Subject to any disclaimer, the term of this patent is extended or adjusted under 35 U.S.C. 154(b) by 0 days.

(21) Appl. No.: 16/398,513

(22) Filed: Apr. 30, 2019

(65) Prior Publication Data

US 2019/0332358 A1 Oct. 31, 2019

(30) Foreign Application Priority Data

Apr. 30, 2018 (IN) .............................. 201841016216

(51) Int. Cl.

| | |
|---|---|
| *G06F 9/44* | (2018.01) |
| *G06F 8/34* | (2018.01) |
| *G06F 16/958* | (2019.01) |
| *G06F 8/41* | (2018.01) |
| *G06N 5/02* | (2006.01) |

(52) U.S. Cl.
CPC ............... G06F 8/34 (2013.01); G06F 8/427 (2013.01); G06F 16/958 (2019.01); G06N 5/02 (2013.01)

(58) Field of Classification Search
CPC .................................... G06F 8/33; G06F 8/38
USPC ....................................................... 717/109
See application file for complete search history.

(56) References Cited

U.S. PATENT DOCUMENTS

| | | | | |
|---|---|---|---|---|
| 6,668,354 | B1* | 12/2003 | Chen .................... | G06F 40/221 715/255 |
| 7,287,248 | B1* | 10/2007 | Adeeb ...................... | G06F 8/30 717/136 |
| 7,886,222 | B2* | 2/2011 | Bagare ...................... | G06F 8/30 715/234 |
| 8,271,411 | B2* | 9/2012 | Kaplan ................... | G06F 40/30 706/46 |
| 8,671,388 | B2* | 3/2014 | Agarwal ................... | G06F 8/30 717/105 |
| 9,514,107 | B1* | 12/2016 | Boswell .................... | G06F 8/30 |
| 9,652,206 | B2* | 5/2017 | Windley .................. | G06F 9/541 |
| 10,268,458 | B1* | 4/2019 | Dolph ....................... | G06F 8/34 |
| 10,466,971 | B2* | 11/2019 | Balasubramanian ..... | G06F 8/30 |
| 10,481,875 | B2* | 11/2019 | Balasubramanian ..... | G06F 8/20 |
| 10,678,521 | B1* | 6/2020 | Krishnamoorthy ....... | G06F 8/38 |
| 2007/0233495 | A1* | 10/2007 | Agapi .......................... | 704/270 |

(Continued)

OTHER PUBLICATIONS

Latif et al.; "Adversarial Machine Learning and Speech Emotion Recognition: Utilizing Generative Adversarial Networks for Robustness"; arXiv.org—Dec. 12, 2018.*

(Continued)

*Primary Examiner* — Francisco J Aponte
(74) *Attorney, Agent, or Firm* — Lerner, David, Littenberg, Krumholz & Mentlik, LLP

(57) ABSTRACT

A method and system for automated creation of graphical user interface applications is provided. The invention provides for provisioning, management and scaling of hardware and software required for the graphical user interface applications by a single action on a command interface of a user terminal, based on a voice command provided by the user.

21 Claims, 3 Drawing Sheets

(56) References Cited

U.S. PATENT DOCUMENTS

| | | | | |
|---|---|---|---|---|
| 2012/0144327 | A1* | 6/2012 | Johnson | G06F 3/0486 715/763 |
| 2013/0339907 | A1* | 12/2013 | Matas | G06T 11/60 715/853 |
| 2014/0096004 | A1* | 4/2014 | Zhou | G06F 16/957 715/728 |
| 2015/0213514 | A1* | 7/2015 | Doig | G06F 16/904 705/14.72 |
| 2017/0083292 | A1* | 3/2017 | McLaughlan | G06F 8/60 |
| 2017/0161032 | A1* | 6/2017 | Chen | G06F 8/20 |
| 2017/0329500 | A1* | 11/2017 | Grammatikakis | G06F 8/38 |
| 2017/0337045 | A1* | 11/2017 | Hills | G06F 8/38 |
| 2018/0136912 | A1* | 5/2018 | Venkataramani | G06N 3/0454 |
| 2018/0174330 | A1* | 6/2018 | Chen | G06F 8/20 |
| 2018/0275957 | A1* | 9/2018 | Chavali | G06F 3/167 |
| 2018/0349103 | A1* | 12/2018 | Brown | G06F 8/315 |
| 2018/0349109 | A1* | 12/2018 | Brown | G06F 8/10 |
| 2019/0080252 | A1* | 3/2019 | Shinn | G06N 5/04 |
| 2019/0121608 | A1* | 4/2019 | Dolph | G06F 40/56 |
| 2019/0121609 | A1* | 4/2019 | Dolph | G06F 40/247 |
| 2019/0317739 | A1* | 10/2019 | Turek | G06N 3/0454 |
| 2019/0324744 | A1* | 10/2019 | Alam | G06F 8/31 |
| 2019/0332648 | A1* | 10/2019 | Dejanovic | G06F 16/9566 |
| 2020/0026488 | A1* | 1/2020 | Yoon | G10L 15/18 |
| 2020/0089672 | A1* | 3/2020 | Velisetti | G06F 21/64 |

OTHER PUBLICATIONS

Sarmah et al.; "Geno: A Developer Tool for Authoring Multimodal Interaction on Existing Web Applications"; UIST 2020. arXiv.org—Jul. 19, 2020.*

* cited by examiner

METHOD AND SYSTEM FOR AUTOMATED CREATION OF GRAPHICAL USER INTERFACES

FIELD OF THE INVENTION

The present invention relates generally to the field of creation of graphical user interface applications. More particularly, the present invention relates to a method and system for automated creation of graphical user interface applications, provisioning, management, and scaling of hardware and software required for the graphical user interface applications based on a text description.

BACKGROUND OF THE INVENTION

In today's day and age, application development is one of the most widespread activity, and more so, with increase in the use of the World Wide Web for dissemination of information. Creation of applications such as graphical user interface, whether for websites or custom software and mobile applications is one of the most crucial processes in software development. Process of application development, typically, entails gathering requirements and converting the requirement to a specific set of instructions that are performed on a specific set of hardware. Various design literature and standard guidelines are referred for design requirements, rules and heuristics for creation of graphical user interfaces. More often than not the act of creating a user interface adhering to the traditional rules and heuristics is an ad-hoc process and designers have different interpretations of these rules and heuristics.

Further, traditionally, the graphical user interface creation process involves converting wireframes and screenshots created by designers into computer code. The code development process involves various manual steps including bringing together of various stakeholders, exploring various alternate options, creating images, mock screens and prototypes, which are eventually created into interactive screens. As such, the process is not only time consuming and expensive but also involves various disparate stages involving different individuals in the process of development. Separate tools are used for each aspect of the development process which requires connecting disparate platforms to achieve consistent results.

Further, implementation of deployment architecture for the end use of the applications is complex and labor intensive as it involves human intervention. For instance, in the case of websites, hardware and software required for different types of webpages, although fairly standard, is time consuming and prone to errors as most of the steps involve manual processes. Furthermore, many of the tasks are repetitive and involves huge overhead cost in the software development life cycle of a user interface application.

In light of the above drawbacks, there is a need for a method and system for automating the process of creation of graphical user interface applications. There is also a need for a method and system for provisioning, management and scaling of hardware and software required for the applications efficiently and with minimum user intervention. Further, there is a need for a method and system that provides for creating and deploying graphical user interfaces by a single click in a command interface of an end-user's terminal.

SUMMARY OF THE INVENTION

In various embodiments of the present invention, the invention provides for a method and system for automated creation of applications. In an embodiment of the present invention, a system for automated end-to-end creation of graphical user interface applications via a single action on a user terminal is provided. The system comprises a memory storing program instructions and a processor for executing the program instructions stored in the memory. The system further comprises a conversational interface in communication with the processor and configured to convert a command received from end-users into a text description. The command is based on parameters provided via the conversational interface for creating a graphical user interface. The system further comprises a parsing engine in communication with the processor and configured to parse the text description to obtain one or more attributes using one or more keywords. Further, the system comprises a design engine in communication with the processor and configured to generate one or more webpage template images based on the one or more attributes, regenerate the webpage template images in a machine identifiable format based on the generated webpage template images, and generate a code in a predetermined format for the generated webpage template images and the regenerated webpage template images. Furthermore, the system comprises an architecture builder in communication with the processor and configured to create hardware and software configurations based on analysis of the one or more attributes retrieved from the parsing engine for generating and deploying software and hardware for creating the graphical user interface.

In an embodiment of the present invention, a method for automated end-to-end creation of graphical user interface applications via a single action on a user terminal is provided. The method comprises converting a command received from end-users into a text description. The command is based on parameters provided via the conversational interface for creating a graphical user interface. The method further comprises parsing the text description to obtain one or more attributes using one or more keywords. Further, the method comprises generating one or more webpage template images based on the one or more attributes. The method further comprises regenerating the webpage template images in a machine identifiable format based on the generated webpage template images. Further, the method comprises generating a code in a predetermined format for the generated webpage template images and the regenerated webpage template images. Finally, the method comprises creating hardware and software based on analysis of the one or more attributes for creating and deploying the graphical user interface.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
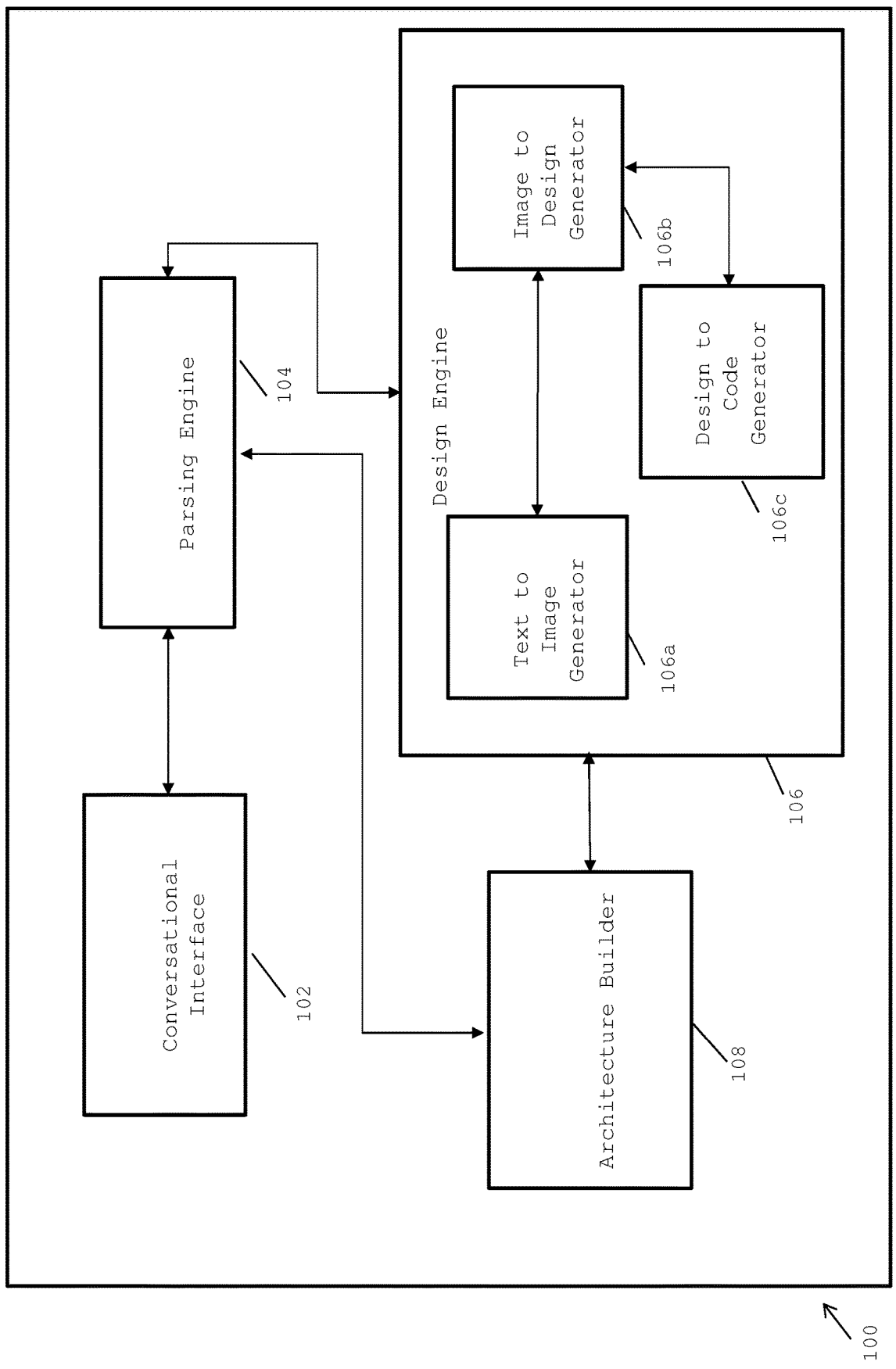
FIG. 1 illustrates a block diagram of a system for automated creation of graphical user interface applications, in accordance with various embodiments of the present invention.

FIG. 1 illustrates a block diagram of a system 100 for automated creation of graphical user interface applications via a single action on a user terminal, in accordance with various embodiments of the present invention. The system comprises a conversational interface 102, a parsing engine 104, a design engine 106, and an architecture builder 108. The conversational interface 102, the parsing engine 104, the design engine 106, and the architecture builder 108 executes various functionalities via a processor using program instructions stored in a memory. The processor is a specific purpose processor that is programmed to execute specific instructions stored in the memory for carrying out the particular functionalities of the conversational interface 102, the parsing engine 104, the design engine 106, and the architecture builder 108, in accordance with various embodiments of the present invention. An exemplary computer system comprising the programmed processor and memory and various other hardware components required for implementing the various embodiments of the present invention is described in FIG. 3 of the specification.

In an exemplary embodiment of the present invention, the system 100 is a tool which may be accessed and operated as a SaaS (Software as a service) at an end-user's terminal (not shown). The end-user may be a website designer. The terminal may include a Personal Computer (PC) laptop, smartphone or any other wired or wireless device. The tool enables the end-user to develop a graphical user interface application by a single action, such as, a single click of a button in a command interface of the end-user's terminal. In another exemplary embodiment of the present invention, the system 100 is a tool which may be accessed and operated as a Paas (Platform as a Service) at an end-user's terminal (not shown) for developing a graphical user interface application by a single click of a button in the command interface of the end-user's terminal.

In various embodiments of the present invention, the system 100 is a tool which is operated as a client device and communicates electronically with a cluster of host servers (not shown) to perform various operations, in accordance with various embodiments of the present invention. The details of the operation are mentioned herein below.

In an embodiment of the present invention, the conversational interface 102 of the system 100 (tool) is a bot interface which receives commands from end-users that represent requirements and specifications for creating a user interface. In an exemplary embodiment of the present invention, the user interface to be created is a user interface of a website. A website is a remote location on a data network, such as the World Wide Web, which contains information that is accessible through a user's browser. The graphical user interface of a website provides for various texts, images, links which allows a user to navigate and retrieve desired information from the data network. Using the conversational interface 102 of the system 100, the end-user provides requirements and specifications for creating the user interface of a website. The conversational interface 102 provides multiple parameters to guide the user, through a set of questions, on specifying the requirements. Examples of the parameters may include, but is not limited to, type of HTML page (e.g. login page), number of users, page image (background, foreground), and security protocol. In an exemplary embodiment of the present invention, the end-user may specify the requirements using standard English language. For example, the end-user may use a voice command such as "I want a login page with cityscape background for 1000 users to be added to my website". The voice command is converted into a text description by the conversational interface 102. The conversational interface 102 also verifies the parameters provided by the end-user with parameters stored in a repository (not shown). Based on the verification with pre-stored parameters, the conversational interface 102 prompts the end-user to provide parameters which the end-user may have missed. One or more parameters in the repository (not shown) are marked as 'mandatory'. The conversational interface 102 is configured to retrieve default values of the parameters marked as 'mandatory' if values of those parameters are not specified by the end-user. The conversational interface 102 then modifies or updates the text description with values of the parameters marked as 'mandatory'.

In an embodiment of the present invention, the parsing engine 104 retrieves the text description specified by the end-user and parses the text description to obtain one or more attributes. The one or more attributes of data is parsed using one or more keywords stored in a knowledge base. The keywords represent content in relation to including, but is not limited to, 'look and feel' and hardware and infrastructural requirements for deployment of the graphical interface to be created for the website. The 'look and feel' of the user interface includes, but is not limited to, icons, page images (background, foreground images), various fields, dropdown menus etc. In an exemplary embodiment of the present invention, the parsing engine 104 uses techniques such as, but not limited to, natural language processing, pattern recognition algorithms for parsing the text description to obtain the one or more attributes. In various exemplary embodiments of the present invention, the knowledge base (not shown) is a self-learning database which updates a list of keywords stored each time a text description is parsed to obtain one or more attributes. For example, the below mentioned text description "I want a login page with cityscape background for 1000 users to be added to my existing website". is parsed by the parsing engine 104 to obtain content such as 'login page', 'cityscape', 'background', '1000', 'users' 'added', 'website'. The parsed content represents the one or more attributes.

In an embodiment of the present invention, the one or more attributes are received by the design engine 106 and the architecture builder 108. The design engine 106 generates page templates, images, backgrounds, and forms using a text to image generator 106a, image to design generator 106b, and design to code generator 106c.

In an exemplary embodiment of the present invention, the text to image generator 106a includes Generative Adversarial Networks (GANs). Images required for a page of the website are generated by analyzing the one or more attributes retrieved from the parsing engine 104, using GAN. The GAN consists of a generator network and a discriminator network. The GAN is trained on a set of captions and webpage templates with respect to various ports (HTML pages) of the website. The discriminator network attempts to categorize correct images, which are represented by standard templates, versus fake images created by the generator network. The generator network tries to create images which are as close to real templates as possible, and in the process tries to compete with the discriminator network. In this way, the generator network learns a typical format for any standard template (e.g. login page, background image etc.). With iterative training, a training set and appropriate network configurations is created, and the GAN generates webpage template images which are indistinguishable from actual webpage templates. The image to design generator 106b assembles the webpage template images generated by the text to image generator 106a and are processed to regenerate the webpage template images in a machine identifiable format. For example, boxes in the webpage template for placeholders or fields are processed to obtain accurate shapes in a machine identifiable format. The design to code generator 106c generates a code in a predetermined format, such as HTML, for the webpage templates generated by the text to image generator 106a and image to design generator 106b. The design to code generator 106c includes an encoder (not shown) and a decoder (not shown). In an exemplary embodiment of the present invention, the encoder is a convolution network which is used to encode the webpage template images to an intermediate representation. The decoder is a sequential network, such as Long Short Term Memory (LSTM) units, which translates the intermediate representation to a sequence of tags (e.g. <html>, </body> etc.). The design to code generator 106c is a self-learning engine which is trained on multiple webpages and codes. The intermediate representation and sequence of tags are generated using the knowhow of the training set, and is updated from time to time each time code is generated for a webpage template image.

In an embodiment of the present invention, the architecture builder 108 retrieves and analyzes the one or more attributes corresponding to the text description from the parsing engine 104 to create an architecture definition. Based on the architecture definition, the architecture builder 108 creates hardware configurations (e.g. web servers for 1000 users etc.). The architecture definition may include key-value pairs in respect of the created hardware configurations. The key-value pairs define hardware of certain configurations. For example, 1000 users may result in a key-value pair that defines server with a certain hardware configuration, while 10000 users would result in key-value pairs that define servers with a larger configuration. The architecture builder 108 stores the key-value pairs in a storage (not shown). In an exemplary embodiment of the present invention, the key-value pairs may be stored in formats such as a JSON or XML object format. (e.g. Server: Tomcat, hard disk=100 GB, RAM=16 GB, number of servers=10). The architecture builder 108 retrieves the key-value pairs from the storage (not shown) and triggers generation of a set of information for provisioning required software stack on the hardware. The architecture builder 108 retrieves the webpage template images created by the design engine 106 and generates containers for the retrieved webpage template images and the provisioning software stack to create executable programs, libraries, and settings for deploying a working and interactive graphical user interface of the website. The architecture builder 108 then generates the software and hardware for deploying the graphical user interface of the website. In an exemplary embodiment of the present invention, the architecture builder 108 generates the software and hardware of the graphical user interface of the website in a cloud infrastructure using a service such as Kubernetes. In an embodiment of the present invention, the architecture builder 108 is configured to automate, deploy, scale, and perform operations of application containers across clusters of host servers.

In various embodiments of the present invention, the system 100 provides a tool which provides for an end-to-end platform that links various stages of software development. The tool enables for automating the end-to-end process of software development for multiple applications, such as, websites, custom software, mobile applications including provisioning, deployment, maintaining and scaling of the applications using deep learning techniques and automated cloud hosting in a single click.

Figure 2:
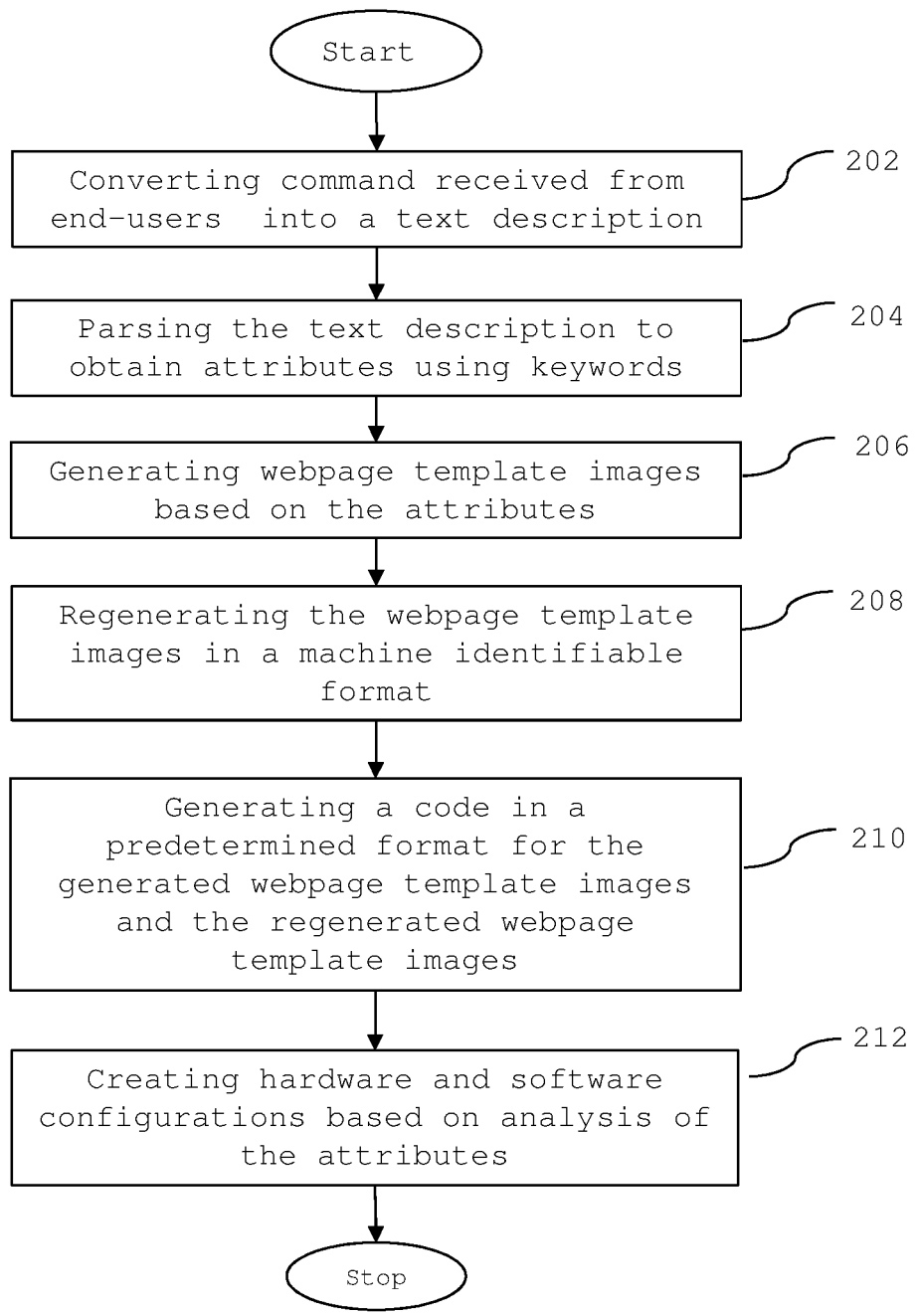
FIG. 2 illustrates a flowchart of a method for automated creation of graphical user interface applications, in accordance with various embodiments of the present invention.

FIG. 2 illustrates a flowchart of a method for automated end-to-end creation of graphical user interface applications via a single action on a user terminal, in accordance with various embodiments of the present invention.

At step 202, a command received from end-users is converted into a text description. In an embodiment of the present invention, the command is based on parameters provided by a conversational interface for creating a graphical user interface. The parameters are provided by the conversational interface to guide the user through a set of questions once the end-user specifies requirements and specifications for creating the graphical user interface. Examples of the parameters may include, but are not limited to, type of HTML page (e.g. login page), no. of users, page image (background, foreground), and security protocol. In an exemplary embodiment of the present invention, the end-user may specify the requirements using standard English language. For example, the end-user may use a voice command such as "I want a login page with cityscape background for 1000 users to be added to my website". The voice command is converted into a text description by the conversational interface. Further, the parameters inputted by the end-user is verified with parameters stored in a repository. Based on the verification with pre-stored parameters, the conversational interface prompts the end-user to provide parameters which the end-user may have missed. One or more parameters in the repository are marked as 'mandatory'. The conversational interface is configured to retrieve default values of the parameters marked as 'mandatory' if values of those parameters are not specified by the end-user. The conversational interface then modifies or updates the text description with values of the parameters marked as 'mandatory'.

At step 204, the text description is parsed to obtain one or more attributes using one or more keywords. In an embodiment of the present invention, the one or more attributes of data is parsed using one or more keywords stored in a knowledge base. The keywords represent content in relation to including, but is not limited to, 'look and feel' and hardware and infrastructural requirements for deployment of the graphical user interface. The 'look and feel' of the user interface includes, but is not limited to, icons, page images (background, foreground images), various fields, dropdown menus etc. In an exemplary embodiment of the present invention, techniques such as, but not limited to, natural language processing, pattern recognition algorithms may be used for parsing the text description to obtain the one or more attributes. In various exemplary embodiments of the present invention, the knowledge base is a self-learning database which updates a list of keywords stored each time a text description is parsed to obtain one or more attributes. For example, the below mentioned text description "I want a login page with cityscape background for 1000 users to be added to my existing website" is parsed to obtain content such as 'login page', 'cityscape', 'background', '1000', 'users' 'added', 'website'. The parsed content represents the one or more attributes.

At step 206, one or more webpage template images are generated based on the one or more attributes. In an embodiment of the present invention, images of webpage templates that are as close to real templates are created. In particular, in an exemplary embodiment of the present invention, images required for a page of a graphical user interface is generated by analyzing the one or more attributes using Generative Adversarial Networks (GANs). The GAN consists of a generator network and a discriminator network. The GAN is trained on a set of captions and webpage templates with respect to various ports (HTML pages) of the graphical user interface. The discriminator network attempts to categorize correct images, which are represented by standard templates, versus fake images created by the generator network. The generator network tries to create images which are as close to real templates as possible, and in the process tries to compete with the discriminator network. In this way, the generator network learns a typical format for any standard template (e.g. login page, background image etc.). With iterative training, a training set and appropriate network configurations is created, and the GAN generates webpage template images which are indistinguishable from actual webpage templates.

At step 208, the one or more webpage template images are regenerated in a machine identifiable format. In an embodiment of the present invention, the webpage template images generated are assembled as per a predetermined format and are processed to regenerate the webpage template images in a machine identifiable format. For example, boxes in a webpage template for placeholders or fields are processed to obtain accurate shapes in a machine identifiable format.

At step 210, a code is generated in a predetermined format for the generated webpage template images and the regenerated webpage template images. In an embodiment of the present invention, the webpage template images are encoded to an intermediate representation. Further, the intermediate representation is translated to a sequence of tags (e.g. <html>, </body> etc.). The intermediate representation and sequence of tags are generated using the knowhow of a training set, and is updated each time code is generated for a webpage template image.

At step 212, hardware and software configurations based on analysis of the one or more attributes are created. In an embodiment of the present invention, the one or more attributes corresponding to the text description are analyzed to create an architecture definition. Based on the architecture definition, hardware configurations (e.g. web servers for 1000 users etc.) are created. The architecture definition may include key-value pairs in respect of the created hardware configurations. The key-value pairs define hardware of certain configurations. For example, 1000 users may result in a key-value pair that defines server with a certain hardware configuration, while 10000 users would result in key-value pairs that define servers with a larger configuration. The key-value pairs may be stored. In an exemplary embodiment of the present invention, the key-value pairs may be stored in formats such as a JSON or XML object format. (e.g. Server: Tomcat, hard disk=100 GB, RAM=16 GB, number of servers=10). The key-value pairs are retrieved from the storage and a set of information for provisioning required software stack on the hardware is created. The webpage template images are retrieved and containers are generated for the retrieved webpage template images and the provisioning software stack to create executable programs, libraries, settings for deploying a working and interactive graphical user interface. Thereafter, software and hardware is generated for deploying the graphical user interface. In an exemplary embodiment of the present invention, the software and hardware of the graphical user interface is generated in a cloud infrastructure using a service such as Kubernetes.

Figure 3:
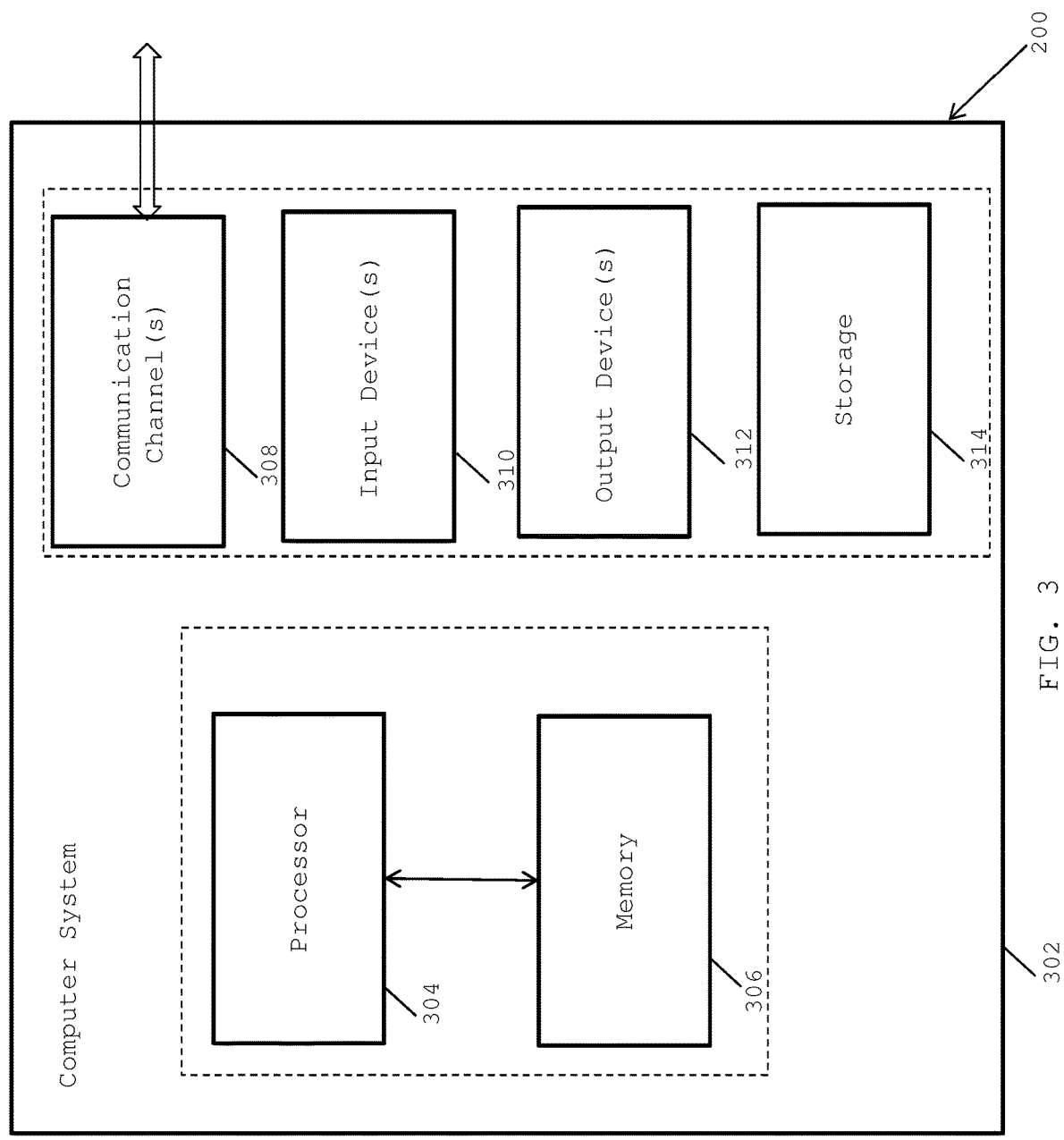
FIG. 3 illustrates an exemplary computer system in which various embodiments of the present invention may be implemented.

FIG. 3 illustrates an exemplary computer system in which various embodiments of the present invention may be implemented.

The computer system 302 comprises the programmed processor 304 and the memory 306 and as a result has modified functioning capabilities, as defined by various embodiments of the present invention, as compared to a general purpose computer. The computer system 302 is not intended to suggest any limitation as to scope of use or functionality of described embodiments. For example, the computer system 302 may include, but not limited to, a programmed microprocessor, a micro-controller, a peripheral integrated circuit element, and other devices or arrangements of devices that are capable of implementing the steps that constitute the method of the present invention. In an embodiment of the present invention, the processor 304 executes program instructions stored in the memory and is a real processor. The memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various software executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 310 may include, but not limited to, a keyboard, mouse, pen, joystick, trackball, a voice device, a scanning device, or any another device that is capable of providing input to the computer system 302. In an embodiment of the present invention, the input device(s) 310 may be a sound card or similar device that accepts audio input in analog or digital form. The output device(s) 310 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from the scope of the invention.

We claim:

1. A system for automated end-to-end creation of graphical user interface applications via a single action on a user terminal, the system comprising:
    a memory storing program instructions;
    a processor executing the program instructions stored in the memory;
    a conversational interface in communication with the processor and configured to convert a command received from end-users into a text description, wherein the command is based on parameters provided via the conversational interface for creating a graphical user interface;
    a parsing engine in communication with the processor and configured to parse the text description to obtain one or more attributes using one or more keywords;
    a design engine in communication with the processor and configured to:
        generate one or more webpage template images based on the one or more attributes retrieved from the parsing engine using a Generative Adversarial Network (GAN), the GAN is trained on a set of captions and webpage templates associated with one or more ports of a website;
        analyse the one or more attributes through an iterative training process of the GAN to create a training set and network configurations for generating the webpage template images, wherein the generated webpage template images are indistinguishable from actual webpage template images;
        assemble the generated webpage templates based on a predetermined format to regenerate the webpage template images in a machine identifiable format; and
        generate a code in a predetermined format for the generated webpage template images; and
    an architecture builder in communication with the processor and configured to create hardware and software configurations based on analysis of the one or more attributes retrieved from the parsing engine for generating and deploying software and hardware for creating the graphical user interface.

2. The system of claim 1, wherein the conversational interface is configured to verify parameters included in the command with pre-stored parameters stored in a repository and prompt the end-users to provide missing parameters.

3. The system of claim 2, wherein the conversational interface is configured to retrieve default values of mandatory parameters from the repository if the missing parameters include the mandatory parameters.

4. The system of claim 3, wherein the conversational interface modifies the text description with values of the mandatory parameters.

5. The system of claim 1, wherein the one or more keywords are stored in a knowledge base and include content representative at least of look and feel, hardware and infrastructural requirements for deployment of the graphical user interface, and wherein the knowledge base is updated with a list of keywords each time a text description is parsed to obtain one or more attributes.

6. The system of claim 1, wherein the design engine comprises a text to image generator configured to create the training set and the network configurations based on the iterative training process of the GAN including a set of captions and webpage templates associated with one or more ports of a website for generating the webpage image templates that resemble actual webpage templates.

7. The system of claim 1, wherein the design engine comprises an image to design generator configured to assemble the generated webpage template images based on the predetermined format to regenerate the generated webpage template images in the machine identifiable format for obtaining accurate shapes of images in the generated webpage templates.

8. The system of claim 7, wherein the design engine includes a design to code generator configured to generate a code for the regenerated webpage templates based on a predetermined format and encode the generated and regenerated webpage templates images to an intermediate representation and translate the intermediate representation to a sequence of tags, wherein the intermediate representation and sequence of tags are generated using the created training set of the GAN and are updated each time the code is generated for the webpage template images.

9. The system of claim 1, wherein the architecture builder generates a set of information for provisioning software stack on the hardware based on the created hardware configurations, and generate containers for the webpage template images retrieved from the design engine, and the provisioning software stack.

10. The system of claim 1, wherein the architecture builder creates an architecture definition based on the analysis of the one or more attributes and creates the hardware configurations based on the architecture definition.

11. The system of claim 10, wherein the architecture definition includes key-value pairs associated with the created hardware configurations and are stored in a storage.

12. The system of claim 9, wherein the architecture builder triggers generation of the provisioning software stack based on the key-value pairs.

13. The system of claim 9, wherein the architecture builder generates the containers to create executable programs, libraries, and settings for deploying the graphical user interface.

14. A method for automated end-to-end creation of graphical user interface applications via a single action on a user terminal, the method comprising:
  converting a command received from end-users into a text description, wherein the command is based on parameters provided via the conversational interface for creating a graphical user interface;
  parsing the text description to obtain one or more attributes using one or more keywords;
  generating one or more webpage template images based on the one or more attributes retrieved from the parsing engine using a Generative Adversarial Network (GAN), the GAN is trained on a set of captions and webpage templates associated with one or more ports of a website;
  analysing the one or more attributes through an iterative training process of the GAN to create a training set and network configurations for generating the webpage template images, wherein the generated webpage template images are indistinguishable from actual webpage template images;
  assembling the generated webpage templates based on a predetermined format to-regenerate the webpage template images in a machine identifiable format;
  generating a code in a predetermined format for the generated webpage template images; and
  creating hardware and software based on analysis of the one or more attributes for creating and deploying the graphical user interface.

15. The method of claim 14, wherein the method comprises verifying parameters included in the command with pre-stored parameters stored in a repository and prompting the end-users to provide missing parameters.

16. The method of claim 14, wherein the method comprises retrieving default values of mandatory parameters from a repository if the missing parameters include the mandatory parameters.

17. The method of claim 14, wherein the method comprises modifying the text description with values of the mandatory parameters.

18. The method of claim 14, wherein the method comprises creating hardware configurations based on an analysis of the one or more attributes and generating a set of information for provisioning software stack on the hardware based on the created hardware configurations.

19. The method of claim 18, wherein key-value pairs associated with the created hardware configurations are generated and are stored in a storage.

20. The method of claim 18, the method comprises generating containers for the webpage template images and the provisioning software stack, wherein the containers are generated to create executable programs, libraries, and settings for deploying the graphical user interface.

21. The method of claim 14, wherein the method comprises encoding the generated and regenerated webpage templates images to an intermediate representation and translating the intermediate representation to a sequence of tags, wherein the intermediate representation and sequence of tags are generated using the created training set of the GAN and are updated each time the code is generated for the webpage template images.

* * * * *